United States Patent [19]

Hall, III et al.

[11] Patent Number: 4,741,225

[45] Date of Patent: May 3, 1988

[54] ENGINE AND TRANSMISSION HOUSING WITH IMPROVED ATTACHMENT

[75] Inventors: Arthur Hall, III, Indianapolis; Harry E. Latshaw, Danville, both of Ind.

[73] Assignee: General Motors Corporation, Detroit, Mich.

[21] Appl. No.: 15,320

[22] Filed: Feb. 17, 1987

[51] Int. Cl.⁴ .................. F16H 57/02; B25G 3/18; F16B 3/00

[52] U.S. Cl. ................. 74/606 R; 403/326; 403/359

[58] Field of Search ......... 403/326, 319, 359; 74/606 R, 606 A, 607, 608, 609; 464/91, 157

[56] References Cited

U.S. PATENT DOCUMENTS

| | | | |
|---|---|---|---|
| 2,912,075 | 11/1953 | Pfistershammer | 403/359 |
| 3,320,771 | 5/1967 | Roethlisberger et al. | 464/91 |
| 3,385,129 | 5/1968 | Duncan et al. | 403/359 |
| 3,454,305 | 7/1969 | Gilmour | 403/359 |
| 3,531,144 | 9/1970 | Bizilia | 403/326 |
| 3,992,119 | 11/1976 | Recker | 403/359 |
| 4,068,965 | 1/1978 | Lichti | 403/313 |
| 4,124,318 | 11/1978 | Sagady | 403/359 |
| 4,125,337 | 11/1978 | Recker | 403/359 |
| 4,261,668 | 4/1981 | Rigal | 403/319 |
| 4,383,799 | 5/1983 | Okano et al. | 403/326 |
| 4,447,750 | 5/1984 | Howlett et al. | 403/326 |
| 4,502,279 | 3/1985 | Fuehrer | 74/606 R |
| 4,523,338 | 6/1985 | May | 403/378 |
| 4,628,758 | 12/1986 | Yuzuriha et al. | 403/359 |
| 4,663,813 | 5/1987 | Carlson | 74/606 R |

FOREIGN PATENT DOCUMENTS

| | | | |
|---|---|---|---|
| 95454 | 2/1963 | Denmark | 403/326 |
| 2327566 | 1/1974 | Fed. Rep. of Germany | 403/326 |
| 777333 | 6/1957 | United Kingdom | 403/359 |
| 1384361 | 2/1975 | United Kingdom | 403/326 |

Primary Examiner—Gary L. Smith
Assistant Examiner—Vinh Luong
Attorney, Agent, or Firm—Patrick M. Griffin

[57] ABSTRACT

In an engine housing and transmission housing adapted to be moved axially together, an easily actuatable and releasable attachment means for joining the housings coaxially together so as to prevent relative rotation and axial separation. Retention grooves cut through interfitting non-rotation splines on the housings provide oppositely facing limit surfaces, with one retention groove also providing a pocket for an expandable and contractable retention ring. In a stored position, the ring is located outside of the root of the splines, so that the housings may be pushed together without resistance, which also serves to align the retention grooves. The ring is then contracted by a single turnable fastener, moving it out of the pocket and between the oppositely facing limit surfaces to prevent axial separation of the housings.

3 Claims, 1 Drawing Sheet

ENGINE AND TRANSMISSION HOUSING WITH IMPROVED ATTACHMENT

The invention herein described was made in the course of work under a contract or subcontract thereunder with the Department of Defense.

This application relates to vehicles generally and specifically to an improved means for joining together an engine and transmission housing that is easily actuated and released.

BACKGROUND OF THE INVENTION

Motor vehicles typically have an engine shaft and a coaxial transmission shaft which must be coupled together. There are numerous attachment means for shafts, many involving complex flexible mechanisms for tolerating shaft misalignment and for damping out vibrations. Engines and transmissions also typically have housings which also must be joined together so as to prevent relative rotation and axial separation. These housings, of course, are much larger in diameter than the shafts. The attachment for such housings have received far less attention than have those for the shafts that they house. The typical conventional housing attachment means involves a pair of abutted circumferential housing flanges fastened together with a multiplicity of axially extending, circumferentially spaced bolts. Although secure, the large number of bolts is obviously complex and time consuming to assemble, and at least some of the bolts are likely to present accessibility problems in assembly and disassembly.

SUMMARY OF THE INVENTION

The invention provides an attachment means for an engine and transmission housing that joins the housings coaxially together so as to prevent relative rotation and axial separation, but which does so with a single fastener so as to be easily actuated and released.

The engine housing has a first cylindrical wall coaxial to the axis and normal to an integral planar flange. The first cylindrical wall has a first set of axially extending splines machined thereon, which terminate on a common plane normal to the axis. The ends of the first splines therefore provide a first planar stop surface that faces in one axial direction and which is spaced from the flange. The first cylindrical wall also has a first annular retention groove cut into it which is aligned with the ends of the first splines.

The transmission housing has a second cylindrical wall, coaxial to the same axis and with a diameter larger than the diameter of the first wall, which is also normal to an integral planar flange. The housings can therefore be moved axially together to bring the first cylindrical wall coaxially within the second cylindrical wall until the flanges, which provide a limit means, engage one another. The second cylindrical wall has a second set of axially extending splines, longer than the first, and sized to interfit with and axially overlap with the first splines when the housings are moved axially together. The interfitting splines prevent the housings from relatively rotating. A second annular retention groove of a thickness equal to the first retention groove is cut through the longer second splines normal to the axis. The ends of the cut second splines thereby provide a pair of planar surfaces, one of which provides a second stop surface facing oppositely to the first stop surface. When the housings are moved together and the two flanges engage, the two retention grooves move into axial alignment. The second retention groove is also cut into the second cylindrical wall far enough to provide an annular pocket that is radially outboard of the root of the second splines.

A generally annular retention ring has a C shaped body with a thickness substantially equal to the two retention grooves and a width sufficiently small to fit within the pocket. The width of the ring body is greater than the radial spacing between the two cylindrical walls. The retention ring also has a pair of spaced legs that extend radially outwardly from the pocket, and are therefore easily accessible. A single turnable fastener, such as a nut and bolt assembly, interconnects the spaced legs. Turning the fastener in either direction moves the legs together or apart, thereby contracting or expanding the ring body either out of, or back into, the pocket. The single fastener may be easily located in an accessible area.

When the ring body is entirely within the pocket, the housings may be moved axially together without interference from the ring until the limiting flanges engage. At that point, with the retention grooves aligned, the attachment means of the invention may be easily actuated by turning the bolt in one direction. This contracts the ring body, moving it out of the pocket and radially inwardly until it is located closely between the first and second axially facing stop surfaces. This prevents the housings from being pulled axially apart. In the preferred embodiment, the ring body, by virtue of its width, also moves into the first retention groove, and part of it also remains within the second retention groove, thereby providing additional resistance to prevent the housings from axially separating. The attachment means of the invention may be as easily released by turning the fastener in the other direction to expand the retention ring radially outwardly back into the pocket. The housings may then be axially separated without resistance.

It is, therefore, a general object of the invention to provide an easily actuated and released attachment means that allows an engine and transmission housing to be joined together so as to prevent relative rotation and axial separation.

It is another object of the invention to provide such an attachment means that uses a single and easily accessible turnable fastener.

It is yet another object of the invention to provide such an attachment means in which interfitting splines that prevent relative rotation of the housings also cooperate to prevent axial separation through the use of alignable retention grooves that are cut through the splines so as to provide planar stop surfaces and so as to provide a pocket that holds a contractable and expandable retention ring, whereby, when the ring is within the pocket, the housings may be moved together without resistance, whereupon turning the single fastener will move the retention ring out of the pocket and between the planar stop surfaces to prevent axial separation.

DESCRIPTION OF THE PREFERRED EMBODIMENT

These and other objects and features of the invention will appear from the following written description and the drawings in which.

Figure 1:
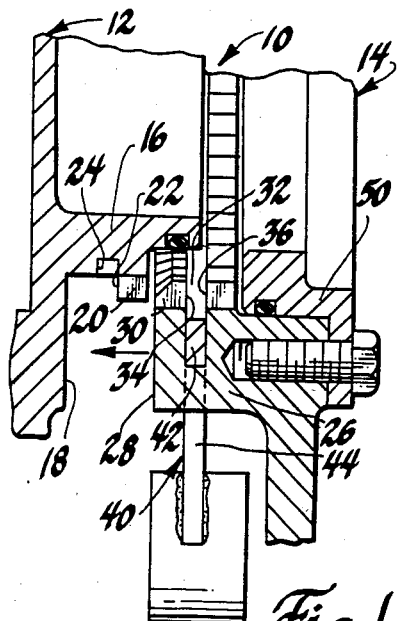
FIG. 1 is a radial cross-sectional view of a portion of an engine and transmission housing axially separated.

Referring first to FIG. 1, a preferred embodiment of the attachment means of the invention 10, is disclosed in combination with an engine housing and a transmission housing, designated generally at 12 and 14 respectively. Housings 12 and 14 are located on a common axis, which is off the page, but which is parallel to the indicated arrow. It will be understood that an engine shaft and a transmission shaft, not illustrated, would turn on the same axis and would be coupled together by structure, not shown. The attachment means of the invention 10 joins the housings 12 and 14 coaxially together so as to prevent relative rotation and axial separation, and does so with a single fastener so as to be easily actuated and released.

Figure 4:
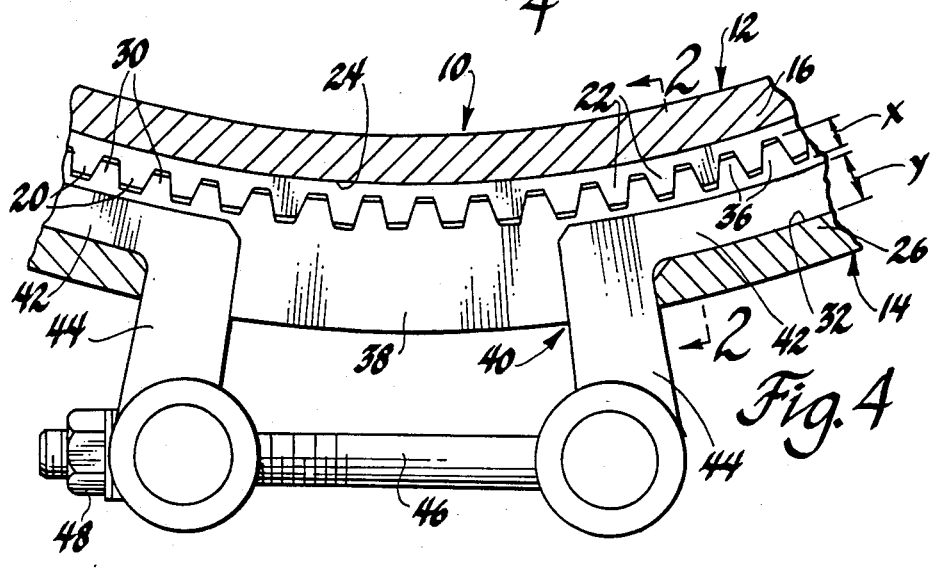
FIG. 4 is a cross-sectional view of a portion of the engine and transmission housing taken along the line 4—4 of FIG. 2.
Figure 5:
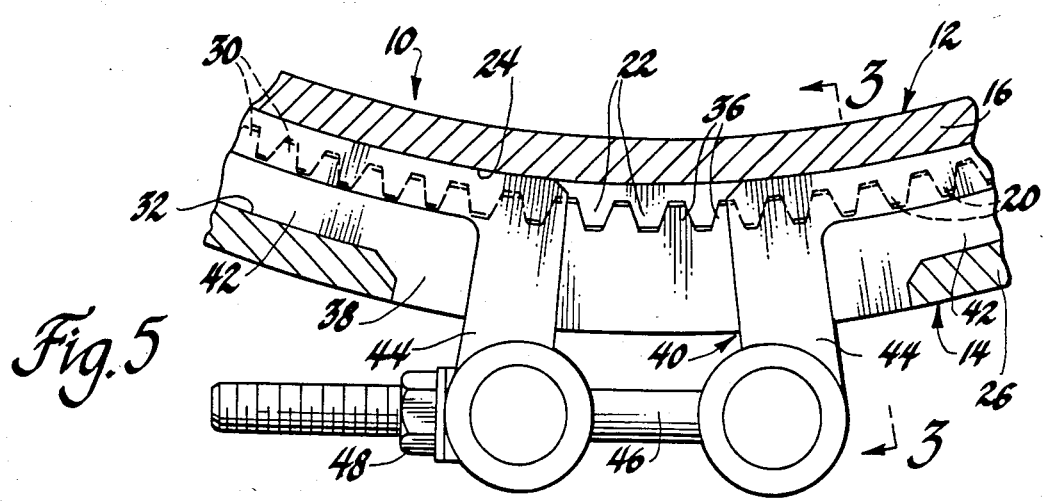
FIG. 5 is a cross-sectional view of a portion of the engine and transmission housing taken along the line 5—5 of FIG. 3.

Referring next to FIGS. 1 and 4, engine housing 12 is a metal casting which also serves as the mount for a flywheel, not illustrated. Cast with engine housing 12 is a first cylindrical wall 16 which is formed about the common axis and which is perpendicular to an integral planar flange 18. A first set of axially extending splines 20 is machined into wall 16 and terminate short of flange 18. The end surfaces 22 of the splines 20 therefore lie on a common plane normal to the axis and provide a first stop surface that faces in one axial direction, spaced from the flange 18. Wall 16 also has a first annular retention groove 24 cut thereinto which is aligned with the spline end surfaces 22. The right hand wall of retention groove 24, therefore, comprises an extension of the planar stop surface provided by the spline end surfaces 22. Retention groove 24 serves a purpose described below.

Referring next to FIGS. 1, and 4, transmission housing 14, also a metal casting, has a second cylindrical wall 26 cast therewith, coaxial to the same axis but with a diameter larger than the diameter of wall 16. Wall 26 is also normal to an integral planar flange 28. The housings 12 and 14 can therefore be nested one within the other. Cylindrical wall 26 has a second set of axially extending splines 30, which are longer than the first splines 16, but which are sized to interfit with and axially overlap splines 20 when the walls 16 and 26 are nested together, as best seen in FIG. 4. The front edges of splines 30 are chamfered to aid the interfitting process. The interfitted splines 20 and 30 prevent the housings 12 and 14 from relatively rotating, and also cooperate with other structure to prevent axial separation, as will be described below. A second annular retention groove 32 of a thickness equal to the first retention groove 24 is cut through the longer second splines 30 normal to the axis. The two sets of end surfaces 34 and 36 of the cut second splines lie on two axially spaced common planes, the left hand ones of which, 34, provide a second stop surface facing oppositely to the first stop surface provided by the first spline end surfaces 22. As best seen in FIG. 4, the second retention groove 32 is cut into the cylindrical wall 26 far enough to provide an annular pocket that is radially outboard of the root of the second splines 30. An access slot 38 opens axially and radially through wall 26, for a purpose described next.

Figure 2:
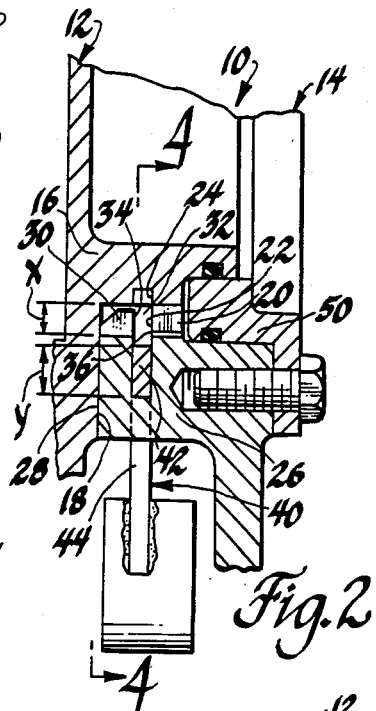
FIG. 2 is a cross-sectional view taken along the line 2—2 of FIG. 4, with the attachment means of the invention released.
Figure 3:
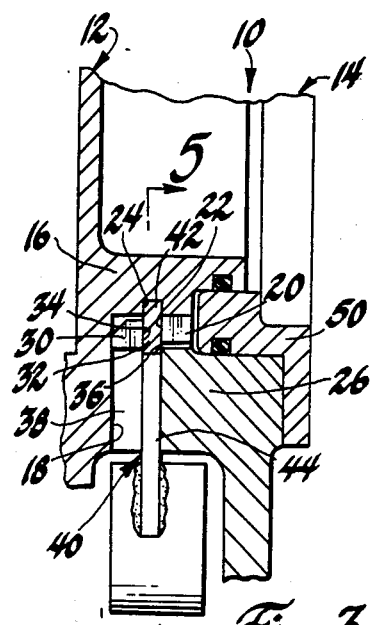
FIG. 3 is a cross-sectional view taken along the line 3—3 of FIG. 5, with the attachment means of the invention actuated.

Referring next to FIGS. 2 and 4, when the housings 12 and 14 are moved axially together, the cylindrical walls 16 and 26 are radially spaced from one another by a distance X. When the two limiting flanges 18 and 28 engage, the retention grooves 24 and 32 are thereby brought into alignment, with the first spline end surfaces 22 and the second spline end surfaces 34 axially facing one another and spaced from one another by the mutual thickness of the retention grooves 24 and 32. The spline end surfaces 22 and 36 are thus moved into coplanar relation, also. A generally annular retention ring, designated generally at 40, has a C shaped body 42 with a thickness substantially equal to the two retention grooves 24 and 32 and a width Y sufficiently small to fit within the pocket provided by retention groove 32. However, the width Y is greater than X, in the embodiment disclosed. Retention ring 40 also has a pair of spaced legs 44 that extend radially outwardly through the access slot 38, and which are therefor easily accessible to an assembler. A single turnable fastener, a threaded bolt 46 and nut 48 in the embodiment disclosed, interconnects the spaced legs 44. When nut 48 is turned in either direction, legs 44 are moved either together or apart, thereby contracting or expanding the ring body 42. As best seen in FIG. 4, with the legs 44 apart, the attachment means 10 of the invention is in a released condition, with the ring 40 in what may be termed a stored position. In the stored position, ring body 42 is at a diameter that allows it to be located in retention groove 32 entirely below the root of the spines 32. It will be understood that retention ring 40 would be loaded into the pocket of retention groove 32 before the housings 12 and 14 were moved together by turning the nut 48 until ring body 42 was sufficiently contracted to fit over cylindrical wall 26. Then, nut 48 would be turned back to expand ring body 42 until it rested entirely below the root of splines 30. Given the fact that there is only a single fastener, it may be easily located in an accessible area, and the ring body 42 will be well protected within the internal pocket of retention groove 32.

Referring now to FIGS. 2 through 5, with the ring body 42 in the stored position, the housings 12 and 14 may be moved axially together to the FIG. 2 position without rubbing interference from ring body 42. At that point, with the splines 20 and 30 interfitted and with the retention grooves 24 and 32 aligned, the attachment means of the invention 10 may be easily actuated by turning nut 48 in one direction, to the left as seen in FIG. 4. This contracts the ring body 42, moving it out of the pocket and radially inwardly until it is located closely between the axially facing spline end surfaces 22 and 34. Because ring body 42 has essentially the same thickness as retention grooves 24 and 32, ring 40 is well guided as it contracts or expands. Ring body 42 will move with little rubbing friction, since the retention grooves 24 and 32 are both cut normal to the axis. After actuation, any force tending to pull the housings 12 and 14 axially apart will then jam the ring body 42 between the facing spline end surfaces 22 and 24, which will occur essentially immediately, because of the matching thicknesses. Thus, the splines 20 and 30, in addition to preventing relative rotation between the housings 12 and 14, also cooperate with ring 40 to prevent axial separation. In the preferred embodiment, the ring body 42, by virtue of its width, also extends into retention groove 24, while remaining partially within retention groove 32. This provides additional resistance to prevent the housings 12 and 14 from axially separating. As disclosed, a separate sealing member 50 is bolted to housing 14 to help seal the radial space between the housings 12 and 14. The attachment means 10 of the invention may be as easily released as it was actuated by turning the nut 48 back, expanding the retention ring radially outwardly back to the stored position of FIG. 4. The housings 12 and 14 may then be axially separated without resistance.

Variations of the preferred embodiment described above may be made within the sprit of the invention. For example, the first retention groove 24 need not absolutely be provided, since the coplanar spline end surfaces 22 alone provide one of the stop surfaces needed to prevent axial separation. By the same token, ring body 42 need not be made wider than X, since it will prevent axial separation so long as it moves between the facing spline end surfaces 22 and 34. However, the extra pull apart resistance provided by the first retention groove 24 in cooperation with wider ring body 42 is an advantage, and groove 24 can be provided with the same machining step that provides the spline end surfaces 22. The spline end surfaces 36 obviously have no function in preventing axial pull apart of the housings 12 and 14, and could thus conceivably be cut back so as to not be coplanar with the right hand wall of retention groove 32. However, since the same machining step that creates groove 32 simultaneously creates both spline end surfaces 34 and 36, there would be no practical reason to do so. Furthermore, if splines 20 were made longer, then retention groove 24 would provide two coplanar spline end surfaces, just as retention groove 32 does when cut through splines 30, giving two sets of oppositely facing stop surfaces, instead of just one. Then, as long as some limit means were provided to align the retention grooves 24 and 32, the two sets of stop surfaces so provided, and the retention ring 40, could prevent the housings 12 and 14 from moving relatively in either axial direction. The flanges 18 and 28 would thus not be absolutely necessary. Turnable fasteners other than nut 48 and bolt 46 could be used, as well. Therefore, it will be understood that the invention is not intended to be limited to just the preferred embodiment disclosed.

The embodiments of the invention in which an exclusive property or privilege is claimed are defined as follows:

1. In combination an engine housing and transmission housing adapted to be moved axially together along an axis, an easily actuatable and releasable attachment means for joining said housings coaxially together so as to prevent relative rotation and axial separation, comprising, a first substantially cylindrical wall formed on one of said housings coaxial to said axis including a first set of axially extending splines, said first splines terminating on a plane normal to said axis so as to provide a first substantially planar stop surface facing in one axial direction, a second substantially cylindrical wall formed on the other of said housings coaxial to said axis including a second set of axially extending splines that interfit with said first splines when said housings are moved axially together, thereby preventing said housings from relatively rotating, said second cylindrical wall further including an annular retention groove cut through said second splines normal to said axis so as to provide a second substantially planar limit surface facing in the other axial direction, said retention groove further extending into said second cylindrical wall sufficiently far to provide an annular pocket radially outside of the root of said second splines, limit means engagable between said housings when said splines are interfitted so as to axially space said first and second limit surfaces from one another by a predetermined distance, a generally annular having a C shaped body with a thickness substantially equal to said predetermined distance and sized so as to fit within said pocket, said retention ring further having a pair of spaced legs extending radially out of said pocket, and, a turnable fastener interconnecting said retention ring legs to so move said legs together and apart and thereby move said ring body out of and into said pocket, whereby said housings may be moved axially together without interference to interfit said first and second splines until said limit means are engaged, whereupon said attachment means may be actuated by turning said fastener in one direction to move said ring body out of said pocket and closely between said axially facing limit surfaces, thereby preventing said housings from being pulled axially apart, said attachment means being releasable by turning said fastener in the other direction to move said retention ring back into said pocket to allow said housings to be pulled axially apart without resistance.

2. In combination an engine housing and transmission housing adapted to be moved axially together along an axis, an easily actuatable and releasable attachment means for joining said housings coaxially together so as to prevent relative rotation and axial separation, comprising, a first substantially cylindrical wall formed on one of said housings coaxial to said axis including a first set of axially extending splines, said first splines terminating on a plane normal to said axis so as to provide a first substantially planar limit surface facing in one axial direction, said first cylindrical wall further including a first annular retention groove aligned with said first limit surface, a second substantially cylindrical wall formed on the other of said housings coaxial to said axis including a second set of axially extending splines that interfit with said first splines when said housings are moved axially together, thereby preventing said housings from relatively rotating, said second cylindrical wall further including a second annular retention groove of a thickness substantially equal to said first annular retention groove cut through said second splines normal to said axis so as to provide a second substantially planar limit surface facing in the other axial direction, said second retention groove further extending into said second cylindrical wall sufficiently far to provide an annular pocket radially outside of the root of said second splines, limit means engagable between said housings when said splines are interfitted so as to bring said first and second retention grooves into alignment, a generally annular retention ring having a C shaped body with a thickness substantially equal to said retention grooves and with a width sufficiently small so as to fit within said pocket, but greater than the radial separation between said first and second cylindrical walls, said retention ring further having a pair of spaced legs extending radially out of said pocket, and, a turnable fastener interconnecting said retention ring legs to so move said legs together and apart and thereby move said ring body out of and into said pocket, whereby said housings may be moved axially together without interference to interfit said first and second splines until said limit means are engaged, whereupon said attachment means may be actuated by turning said fastener in one direction to move said ring body out of said pocket and closely between said axially facing limit surfaces, thereby preventing said housings from being pulled axially apart, said ring body, by virtue of its width, also extending into said retention grooves so as to provide additional resistance to prevent said housings from being pulled axially apart, said attachment means being releasable by turning said fastener in the other direction to move said retention ring back into said pocket to allow said housing to be pulled axially apart without resistance.

3. In combination an engine housing and transmission housing adapted to be moved axially together along an axis, an easily actuatable and releasable attachment means for joining said housings coaxially together so as to prevent relative rotation and relative axial movement, comprising, a first substantially cylindrical wall formed on one of said housings coaxial to said axis including a first set of axially extending splines, said first cylindrical wall including a first retention groove cut through said first splines normal to said axis so that said first splines provide a pair of substantially planar limit surfaces facing in opposite axial directions, a second substantially cylindrical wall formed on the other of said housings coaxial to said axis including a second set of axially extending splines that interfit with said first splines when said housings are moved axially together, thereby preventing said housings from relatively rotating, said second cylindrical wall further including a second annular retention groove of similar thickness to said first retention groove cut through said second splines normal to said axis so as to also provide a pair of substantially planar limit surfaces facing in opposite axial directions, said second retention groove further extending into said second cylindrical wall sufficiently far to provide an annular pocket radially outside of the root of said second splines, limit means engagable between said housings when said splines are interfitted so as to bring said first and second retention grooves into axial alignment, a generally annular retention ring having a C shaped body with a thickness substantially equal to the thickness of said retention grooves and sized so as to fit within said pocket, said retention ring further having a pair of spaced legs extending radially out of said pocket, and, a turnable fastener interconnecting said retention ring legs to so move said legs together and apart and thereby move said ring body out of and into said pocket, whereby said housings may be moved axially together without interference to interfit said first and second splines until said limit means are engaged, whereupon said attachment means may be actuated by turning said fastener in one direction to move said ring body out of said pocket and closely between both of said pairs of axially oppositely facing limit surfaces, thereby preventing said housings from being relatively moved in either axial direction, said attachment means being releasable by turning said fastener in the other direction to move said retention ring back into said pocket to allow said housings to be pulled axially apart.

* * * * *